Patented Aug. 16, 1932

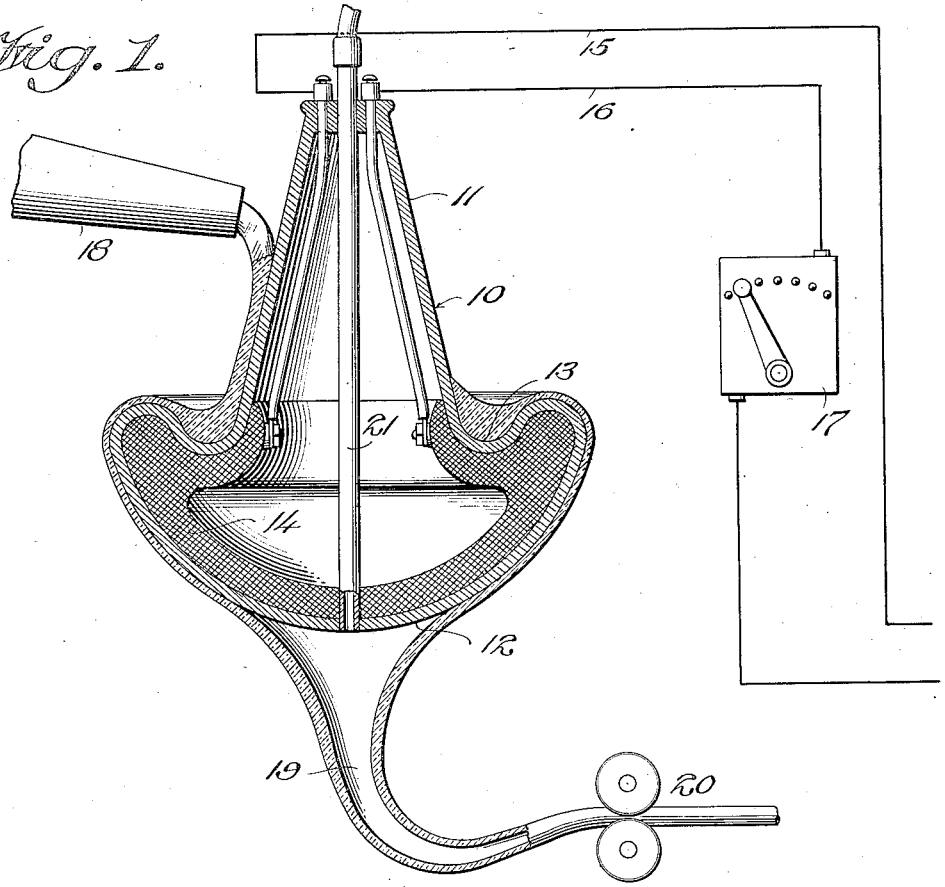

1,872,542

UNITED STATES PATENT OFFICE

ALLEN CHARLES WILCOX, OF BRIDGEPORT, OHIO, ASSIGNOR TO LIBBEY-OWENS-FORD GLASS COMPANY, OF TOLEDO, OHIO, A CORPORATION OF OHIO

GLASS DRAWING APPARATUS

Application filed March 3, 1921. Serial No. 449,285.

My invention relates to improvements in apparatus for producing drawn glassware, my object being to eliminate many of the disadvantages encountered in the use of apparatus for this purpose, and to provide a dependable apparatus which will produce ware of uniform size and shape.

It is understood that in producing drawn glassware the glass is first heated in a tank and while in molten condition passed from the tank to suitable drawing apparatus whereby it is formed into desired shapes. The glass in passing from the tank to the drawing apparatus tends to cool and harden and unless this is prevented it is practically impossible to draw the same into desired shapes. Gas burners and other types of heating apparatus have been used heretofore for heating the glass between the time it leaves the tank and the time it enters or contacts with the drawing apparatus, but so far as I am aware no means heretofore provided for heating the glass during the period mentioned has proven entirely satisfactory for the reason that such means must be capable of regulating the temperature of the heat and in addition it must be capable of constantly maintaining the temperature, and gas burners and other types of heating apparatus do not accomplish the latter purpose, the result being that drawn ware as now produced varies in size and shape, and as much of it must be scrapped and reheated with consequent loss of time and labor the cost of production becomes high and the ware correspondingly expensive.

My invention aims to eliminate the aforementioned disadvantages by providing an improved apparatus which is capable not only of regulating the heating temperature, but in addition is capable of maintaining that temperature constant over any given period of time, and furthermore, is capable of being quickly and easily adjusted to change the temperature from one degree of heat to another.

In describing my invention in detail reference will be had to the accompanying drawing, illustrative of a preferred structural embodiment of my improved apparatus, and in which:—

The figure is a vertical section of a tube drawing apparatus embodying the essential features of my invention.

Referring to the figure of the drawing, 10 designates a hollow member including a frustro-conically shaped portion 11 which at its lower end is extended outward and upward and thence downward and inward in substantially unbroken curves to produce a bottom surface 12 of substantially hemi-spherical shape and an annular trough or gutter 13 between the portion 11 and said surface. Within this member is arranged an electric heating element 14 connected with a source of electric energy by conductors 15 and 16 in one of which is arranged a rheostat 17 whereby the temperature of said heating element may be regulated.

Suitable means 18 leads from a tank or other source of molten glass to a point in proximity to the portion 11 whereby molten glass is delivered and distributed substantially evenly to said trough or gutter 13. As long as glass is supplied to the gutter it overflows the same and follows down the hemispherical exterior bottom surface 12 under the influence of gravity and capillary attraction until it approaches the lowermost point in said surface when it leaves the same in tubular form as illustrated at 19 after which it is engaged with suitable apparatus, conventionally illustrated at 20 for drawing and forming the same into desired size and shape.

From the foregoing it will be observed that the molten glass in overflowing from the gutter 13 assumes uniform proportions at all points on the hemi-spherical surface 12 so that the drawn tubing maintains a uniform size, and since the electric heating element is capable of heating the surface 12 uniformly at any desired temperature, whereby a proper drawing fluidity of the molten glass is obtained, the drawn tubing maintains uniform shape.

In order to avoid an inherent tendency of the tubing to flow together as it leaves the hemi-spherical surface 12 and as it is being drawn, a tube 21 is extended through the member 10 and is arranged so that its lower end opens through the lowermost point in said hemi-spherical surface while its upper end is connected with a suitable compressed air supply, whereby air is admitted to the tubing to cause it to maintain its tubular form.

I claim:

1. In glass drawing apparatus, a member having an inwardly directed exterior surface extending from a predetermined point in its length to its lower end and further having an inwardly extending ledge at the upper end of said surface provided with a gutter adapted to receive molten glass from a supply and deliver the same by overflow uniformly to the upper end of the surface and thereby effect downward flow of the molten glass over the surface under the influence of gravity.

2. In glass drawing apparatus, a hollow member having an inwardly directed exterior surface extending from a predetermined point in its length to its lower end, means carried by the member for receiving molten glass from a supply and then uniformly delivering the same to the upper end of said surface to effect downward flow over the surface under the influence of gravity, and heating means within the member in effective relation to said surface.

3. In glass drawing apparatus, a hollow member having an inwardly directed exterior surface extending from a predetermined point in its length to its lower end and further having an inwardly extending ledge at the upper end of said surface provided with a gutter adapted to receive molten glass from a supply and deliver the same by overflow uniformly to the upper end of the surface and thereby effect downward flow of the molten glass over the surface under the influence of gravity, and heating means within the member in effective relation to said surface.

4. In a glass drawing apparatus, a member having an inwardly directed exterior surface extending from a predetermined point in its length to its lower end, means at the upper end of the member for receiving molten glass from a supply and then uniformly delivering the same to the upper end of said surface to effect downward flow of the molten glass over the surface under the influence of gravity, and means within the member for heating the same.

5. In a glass drawing apparatus, a hollow member having an exterior spherical surface adapted to receive molten glass from a supply at a point to permit downward flow of the glass over the surface under the influence of gravity, an electric heating element within the member adjacent said sperical surface, and means for drawing the glass from said surface as it flows downward thereon.

6. In a glass drawing apparatus, a hollow member having an exterior spherical bottom surface and an inwardly disposed annular gutter at the upper end of said spherical surface adapted to receive molten glass from a supply whereby the overflow from said gutter will move downward over the spherical surface under the influence of gravity, an electrical heating element within the member for heating the spherical surface, means for drawing the glass from said spherical surface as it moves downward thereon, and means for discharging air through said surface at a point to maintain the draw tubular.

7. In glass drawing apparatus, a hollow member having an inwardly directed exterior surface extending from a predetermined point in its length to its lower end, means carried by the member for receiving molten glass from a supply and then delivering the same to the upper end of said surface to effect downward flow over the surface under the influence of gravity, and heating means within the member in effective relation to said surface.

8. The art of drawing glass which consists in supplying molten glass to an overflow chamber or spillway in the upper portion of a member having downwardly converging side portions, and causing the glass to freely flow from said receptacle down the converging side portions of said member without contact with any auxiliary means.

9. The method of drawing glass which consists in supplying molten glass to an overflow chamber or spillway connecting with downwardly converging side portions, causing the glass to continuously flow from said chamber down the converging side portions without interruption and while maintained out of contact with auxiliary means, and guiding away the glass from a point below said converging side portions.

10. In a glass drawing apparatus, the combination of a directing member down the outer surface of which molten glass is intended to flow in film form, the directing member having a glass overflow chamber or spillway at a point spaced upwardly from the lower end thereof, and means for delivering molten glass into the chamber whereby the glass is caused to flow in different directions from the said chamber and thence down over the outer surface of the directing member, which directing member constitutes a spacing medium for inner portions of the film formation.

11. In a glass drawing apparatus, the combination of a vertically disposed member, having a horizontally disposed overflow chamber or spillway in the upper portion thereof, of means for delivering molten glass into said chamber, the wall of said chamber being adapted to permit the glass to overflow from the chamber in different directions downwardly over the outer vertical surface of said member in layer form, the member constituting a spacing means for portions of the glass.

12. In a glass drawing apparatus the combination of a vertically disposed glass directing member having a horizontally disposed recess forming an overflow chamber or spillway from which the glass overflows down the glass directing member, whereby the latter acts to separate and hold out of contact inner face portions of the overflowing glass, and said directing member being constructed and arranged whereby the flow of glass will be free and uninterrupted.

In testimony whereof I hereunto affix my signature.

ALLEN CHARLES WILCOX.